United States Patent [19]

Birnbaum et al.

[11] Patent Number: 4,972,257
[45] Date of Patent: Nov. 20, 1990

[54] OPERATOR ADJUSTABLE COLOR IMAGE PROCESSING

[75] Inventors: David Birnbaum, Pittsford; Lee A. Cass, Rochester, both of N.Y.

[73] Assignee: Xerox Corporation, Stamford, Conn.

[21] Appl. No.: 332,866

[22] Filed: Apr. 3, 1989

[51] Int. Cl.⁵ .............................................. G03F 3/08
[52] U.S. Cl. ........................................ 358/80; 358/75
[58] Field of Search ..................... 358/75, 78, 80, 76

[56] References Cited

U.S. PATENT DOCUMENTS

| | | | |
|---|---|---|---|
| 4,643,563 | 2/1987 | Sayanagi | 355/77 |
| 4,668,980 | 5/1987 | Stansfield et al. | 358/80 |
| 4,769,696 | 9/1988 | LItsuda et al. | 358/75 |
| 4,789,892 | 12/1988 | Tsuzuki et al. | 358/75 |
| 4,792,847 | 12/1988 | Shimazaki et al. | 358/75 |
| 4,839,721 | 6/1989 | Abdulwahab et al. | 358/80 |
| 4,839,722 | 6/1989 | Barry et al. | 358/75 |
| 4,882,622 | 11/1989 | Mzuda et al. | 358/75 |

*Primary Examiner*—Howard W. Britton
*Assistant Examiner*—Kim Yen Vu
*Attorney, Agent, or Firm*—H. Fleischer; J. E. Beck; R. Zibelli

[57] ABSTRACT

An operator controllable apparatus which adjusts the color of a copy being reproduced from a multi-colored original document. The original document is scanned and a set of primary color densities therein measured. The measured set of primary color densities is changed to a set of colorimetric coordinates. The operator adjusts the set of colorimetric coordinates so that the copy has the desired hue, saturation and darkness. The operator adjusted set of colorimetric coordinates is transformed into a set of subtractive primary color densities. This set of subtractive primary color densities controls the marking engine to form a copy having the desired hue, saturation and darkness.

8 Claims, 2 Drawing Sheets

OPERATOR ADJUSTABLE COLOR IMAGE PROCESSING

This invention relates generally to a color electronic reprographic printing system, and more particularly concerns an operator controllable apparatus for adjusting the color of the copy being reproduced from a multi-colored original document.

Fequently, the marking engine of an electronic reprographic printing system is an electrophotographic printing machine. In an electrophotographic printing machine, a photoconductive member is charged to a substantially uniform potential to sensitize the surface thereof. The charged portion of the photoconductive member is exposed. Exposure of the charged photoconductive member selectively dissipates the charge thereon in the irradiated areas. This records an electrostatic latent image on the photoconductive member corresponding to the informational areas contained within the original document being reproduced. After the electrostatic latent image is recorded on the photoconductive member, the latent image is developed by bringing toner into contact therewith. This forms a powder image on the photoconductive member which is subsequently transferred to a copy sheet. The copy sheet is heated to permanently affix the marking particles thereto in image configuration.

Multi-color electrophotographic printing is substantially identical to the foregoing process of black and white printing. However, rather than forming a single latent image on the photoconductive surface, successive latent images corresponding to different colors are recorded thereon. Each single color electrostatic latent image is developed with toner of a color complimentary thereto. This process is repeated a plurality of cycles for differently colored images and their respective complimentarily colored toner. Each single color toner image is transferred to the copy sheet in superimposed registration with the prior toner image. This creates a multilayered toner image on the copy sheet. Thereafter, the multi-layered toner image is permanently affixed to the copy sheet creating a color copy. The developer material may be a liquid material or a powder material.

In an electronic reprographic printing system, the multi-colored original document is scanned and coverted to digital signals. These digital signals control an output scanner which selectively exposes the charged photoconductive surface to record the latent images thereon. The digital signals are processed to convert them from measurements of the density of the red, green, and blue primary colors of the original document to the densities of the subtractive prmimary colors, cyan, magenta and yellow. It is desirable to enable the operable to adjust the color balance from that obtained by normal machine settings. Existing systems provide some type of color adjustment by allowing the operator to manipulate the contrast of the individual color passes. This technique is particularly suitable for black and white reproductions. However, it is less useful in forming color reproductions. Typically the operator desires to adjust the darkness, saturation or hue of the copy. The individual separation contrast adjustment technique does not provide a simple technique for the operator to make these adjustments. Various approaches have been devised for processing color image data. The following disclosure appears to be relevant:

U.S. Pat. No. 4,643,563 Patentee: Sayanagi Issued: Feb. 17, 1987.

The relevant portions of the foregoing patent may be briefly summarized as follows:

U.S. Pat. No. 4,643,563 discloses a color image method for properly reproducing color through the use of micro color points of a plurality of colors. Color stimulus specifications, X, Y, and Z are input to a matrix circuit which compares the element with the chromaticity chart to determine the output signal for color generation.

Pursuant to the features of the present invention, there is provided an apparatus for adjusting the color of a copy being reproduced from a multi-colored original document. The apparatus includes means for scanning the original document and measuring a set of primary color densities therein. Operator controllable means, in communication with the scanning system, convert the measured set of primary color densities to signals corresponding to a set of operator selected subtractive primary color densities.

In another aspect of the present invention, there is provided a printing system in which the color of a copy being formed from an original document is adjustable. The printing system includes means for scanning the original document and measuring a set of primary color densities therein. Operator controllable means, in communication with the scanning system, convert the measured set of primary color densities to signals corresponding to a set of operator selected subtractive primary color densities. A marking engine receives the signals from the converting means and forms a copy of the original document in response thereto.

In still another aspect of the present invention, there is provided a method of adjusting the color of a copy being reproduced from a multicolored original document. The original document is scanned and a set of primary color densities therein measured. The measured set of primary color densities is converted into signals corresponding to a set of operator adjusted subtractive primary color densities.

Other aspects of the present invention will become apparent as the following description proceeds and upon reference to the drawings, in which.

While the preseent invention will hereinafter be described in connection with a preferred embodiment and method of use thereof, it will be understood that it is not intended to limit the invention to that embodiment or method of use. On the contrary, it is intended to cover all alternatives, modifications and equivalents as may be included within the spirit and scope of the invention as defined by the appended claims.

Figure 1:
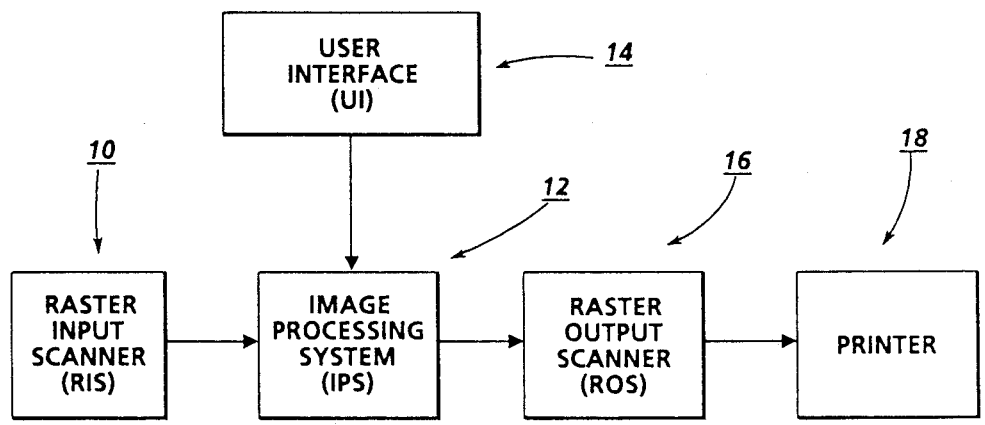
FIG. 1 is a block diagram illustrating the operation of an electronic reprographic printing system incorporating the features of the present invention therein.

For a general understanding of the features of the present invention, reference is made to the drawings. In the drawings, like references have been used throughout to designate identical elements. FIG. 1 is a block diagram of an illustrative electronic reprographic system incorporating the features of the present invention therein. It will become evident from the following discussion that the present invention is equally well suited for use in a wide variety of printing systems, and is not necessarily limited in its application to the particular system shown herein.

Turning initially to FIG. 1, a multi-color original document is positioned on the raster input scanner (RIS), indicated generally by the reference numeral 10. The RIS contains document illumination lamps, optics, a mechanical scanning drive, and a charge coupled device (CCD array). The RIS captures the entire original document and converts it to a series of raster scan lines. Thus, the hard copy original document is converted to electronic form. In a multi-color system, the RIS measures a set of primary color densities, i.e. red, green and blue densities, at each point of the original document. This information is transmitted to an image processing system (IPS), indicated generally by the reference numeral 12. IPS 12 is the control electronics which prepare and manage the image data flow to the raster output scanner (ROS), indicated generally by the reference number al 16. The IPS converts the set of primary color densities to a set fo colorimetric coordinates by means of a first table of lookup functions. The darkness, saturation, and hue of the colors of the copy are adjusted by appropriately transforming the set of colorimetric coordinates. A user interface (UI), indicated generally by the reference numeral 14, is in communication with the IPS. The UI enables the operator to adjust the hue, saturation, or darkness of the colors. The output signal from the UI appropriately modifies the set of colorimetric coordinates to achieve the desired hue, saturation or darkness. A second table of lookup functions in the IPS converts the operator adjusted set of colorimetric coordinates to a set of subtractive primary color densities, i.e. cyan, magenta, and yellow densities, having the operator selected hue, saturation and darkness. The signal corresponding to the operator adjusted set of subtractive primary color densities is transmitted to ROS 16, which creates the output copy image. ROS 16 lays out the image in a series of horizontal scan lines with each line having a specified number of pixels per inch. The ROS includes a laser having a rotating polygon mirror block associated therewith. The ROS exposes the charged photoconductive surface of the printer, indicated generally by the reference numeral 18, to achieve a set of subtractive primary latent images having the desired output density. The latent images are developed with cyan, magenta, and yellow developer material, respectively. These developed images are transferred to a copy sheet in superimposed registration with one another to form a multi-colored image on the copy sheet. This multi-colored image is then fused to the copy sheet forming a color copy. In this way, the hue, saturation and darkness of the copy are operator adjustable.

Figure 2:
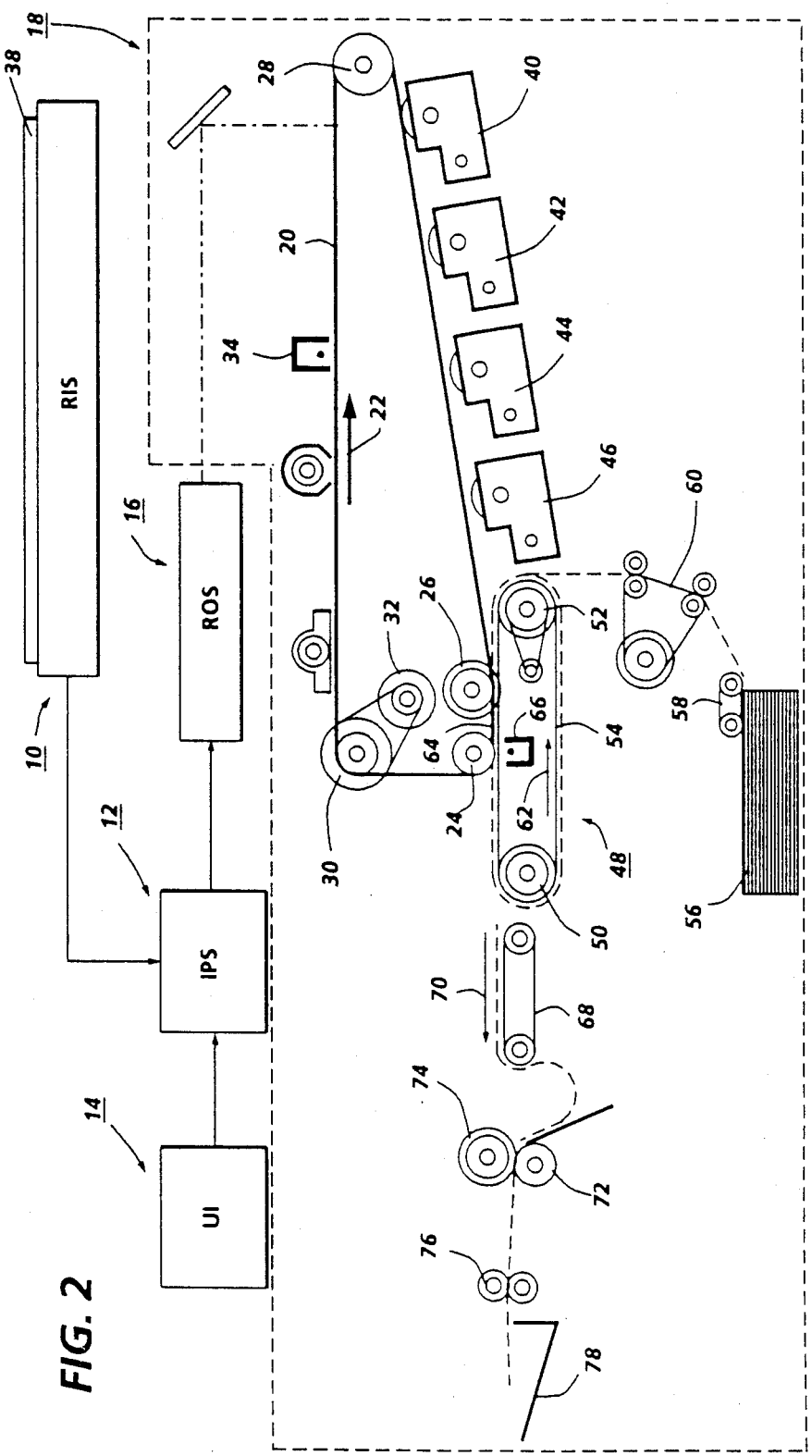
FIG. 2 is a schematic elevational view showing further details of the FIG. 1 electronic reprographic printing system.

Turning now to FIG. 2, there is shown the system of FIG. 1 in greater detail. As depicted thereat, printer or marking engine 18 is an electrophotographic printing machine. The electrophotographic printing machine employs a photoconductive belt 20. Preferably, the photoconductive belt 20 is made from a polychromatic photoconductive material. Belt 20 moves in the direction of arrow 22 to advance successive portions of the photoconductive surface sequentially through the various processing stations disposed about the path of movement thereof. Belt 20 is entrained about transfer rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through the charging station. At the charging station, a corona generating devices, indicated generally by the reference numeral 34 charges photoconductive belt 20 to a relatively high, substantially uniform potential.

Next, the charged photoconductive surface is rotated to the exposure station. The exposure station includes the RIS 10 having a multicolored original document 38 positioned thereat. The RIS has document illumination lamps, optics, a scanning drive, and photosensing elements, such as a CCD array, i.e. a charge coupled device. The RIS captures the entire image from the original document 38 and converts it to a series of raster scan lines which are transmitted as electrical signals to IPS 12. The electrical signals from the RIS correspond to the red, green and blue densities at each point in the document. By using a first table of lookup values, the IPS converts the set of red, green and blue density signals, i.e. the set of signals corresponding to the primary color densities of original document 38, to a set of colorimetric coordinates. The operator actuates the appropriate keys of the UI 14 to adjust the hue, saturation or darkness of the copy. UI 14 may be a touch screen or any other suitable control panel providing an operator interface with the system. The output signals from the UI are transmitted to the IPS so as to adjust the set of colorimetric coordinates to achieve the desired copy hue, saturation and darkness. This results in a set of operator adjusted colorimetric coordinates. The IPS then uses a second table of lookup values to convert the set of operator adjusted colorimetric coordinates to a set of signals corresponding to the subtractive primary densities of the copy, i.e. cyan, magenta, and yellow density signals. These signals are transmitted to ROS 16. ROS 16 includes a laser with rotating polygon mirror blocks. Preferably, a nine facet polygon is used. The ROS illuminates the charged portion of photoconductive belt 20 at a rate of about 400 pixels per inch. The ROS will expose the photoconductive belt to record three latent images. One latent image is adapted to be developed with cyan developer material. Another latent image is adapted to be developed with magenta developer material with the third latent image being developed with yellow developer material. The latent images formed by the ROS on the photoconductive belt correspond to the signals from IPS 12. In this way, the hue, saturation and darkness of the copy color are operator adjusted.

After the electrostatic latent image has been recorded on photoconductive belt 20, belt 20 advances the electrostatic latent image to the development station. The deveolopment station includes four individual developer units genrally indicated by the reference numerals 40, 42, 44 and 46. The developer units are of a type generally referred to in the art as "magnetic brush development units." Typically, a magnetic brush development system employs a magnetizable developer material including magnetic carrier granules having toner particles adhering triboeletrically thereto. The developer material is continually brought through a directional flux field to form a brush of developer material. The developer particles are continually moving so as to provide the brush consistently with fresh developer material. Development is achieved by bringing the brush of developer material into contact with the photoconductive surface. Developer units 40, 42, and 44, respectively, apply toner particles of a specific color which corresponds to the compliment of the specific color separated electrostatic latent image recorded on the photoconductive surface. The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 10, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of the operative position. In the operative position, the magnetic brush is closely adjacent the photoconductive belt, while, in the nonoperative position, the magnetic brush is spaced therefrom. During development of each electrostatic latent image only one developer unit is in the operative position, the remaining developer units are in the nonoperative position. This insures that each electrostatic latent image is developed with toner particles of the appropriate color without comingling. In FIG. 1, developer unit 40 is shown in the operative position with developer units 42, 44 and 46 being in the non-operative position.

After development, the toner image is moved to the transfer station where the toner is transferred to a sheet of support material, such as plain paper amongst others. At the transfer station, the sheet transport apparatus, indicated generally by the reference numeral 48, moves the sheet into contact with photocoductive belt 20. Sheet transport 48 has a pair of spaced belts 54 entrained about rolls 50 and 52. A gripper extends between belts 54 and moves in unison therewith. The sheet is advanced from a stack of sheets 56 disposed on a tray. A feed belt 58 advances the uppermost sheet from stack 56 onto a conveyor 60. Conveyor 60 advances the sheet to sheet transport 48. The sheet is advanced by conveyor 60 in synchronism with the movement of the gripper. In this way, the leading edge of the sheet arrives at a preselected position to be received by the open gripper. The gripper then closes securing the sheet thereto for movement therewith in a recirculating path. The leading edge of the sheet is secured releasably by the gripper. As the belts move in the direction of arrow 62, the sheet moves into contact with the photoconductive belt, in synchronism with the toner image developed thereon. At transfer zone 64, a corona generating device 66 sprays ions onto the backside of the sheet so as to charge the sheet to the proper magnitude and polarity for attracting the toner image from photoconductive belt 20 thereto. The sheet remains secured to the gripper so as to move in a recirculating path for three cycles. In this way, three different color toner images are transferred to the sheet in superimposed registration with one another. Each of the electrostatic latent image recorded on the photoconductive surface are developed with the appropriately colored toner which are transferred, in superimposed registration with one another to the sheet to form the multi-color copy of the colored original document.

After the last transfer operation, the grippers open and release the sheet. Conveyor 68 transports the sheet, in the direction or arrow 70, to the fusing station where the transferred image is permanently fused to the sheet. The fusing station includes a heated fuser roll 72 and a pressure roll 74. The sheet 52 passes through the nip defined by fuser roll 72 and pressure roll 74. The toner image contacts fuser roll 72 so as to be affixed to the sheet. Thereafter, the sheet is advanced by forwarding roll pairs 76 to catch tray 78 for subsequent removal therefrom by the machine operator.

The last processing station in the direction of movement of belt 20, as indicated by arrow 22, is the cleaning station. A rotatably mounted fibrous brush 80 is positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle.

Figure 3:
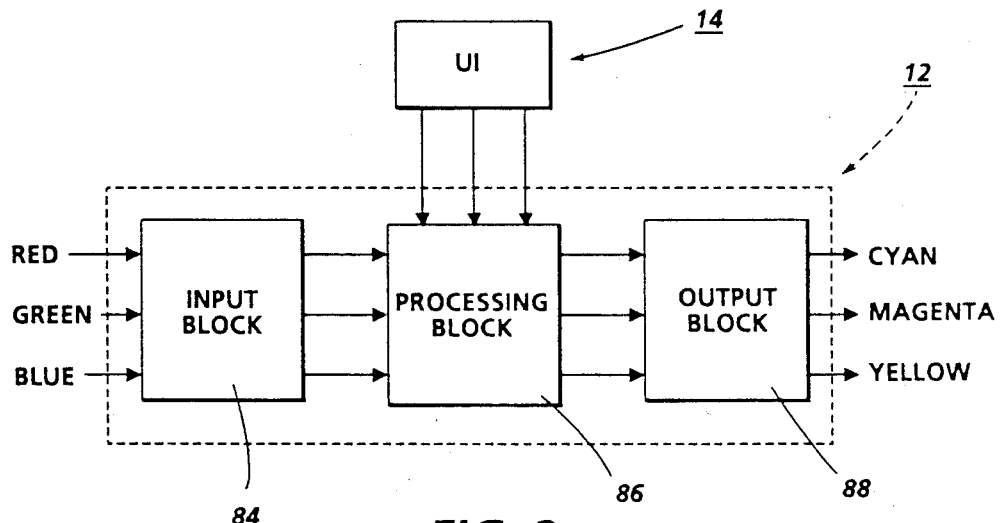
FIG. 3 is a block diagram depicting the image processing system used in the FIG. 1 reprographic printing system in greater detail.

Referring now to FIG. 3, there is shown further details of IPS 12. As shown thereat the signals from the RIS, corresponding to the measured set of red, green and blue densities, are transmitted to input block 84. Input block 84 transforms the set of red (R), greeen (G) and blue (B) densities to a set of colorimetric coordinates, L*a*b*. The technique to transform the RGB densities to L*a*b* is based upon the empirical observation that a transformation exists between a set of RGB densities and L*a*b*. This relationship depends upon the characteristics of the input set of colorants and the particular sensor being used to measure the densities. For a specific sensor and set of input colorants, the RGB densities and L*a*b* coordinates can be measured separately. Standard regression techniques can then be used to develop a set parameters defining the relationship between RGB and L*a*b*. The following quadratic equation provides a moderately good estimate of this relationship:

$$L^* = (a_1)(R) + (a_2)(G) + (a_3)(B) + (a_4)(R)(G) + (a_5)(R)(B) + (a_6)(G)(B) + (a_7)(R^2) + (a_8)(G^2) + (a_9)(B^2)$$

$$a^* = (b_1)(R) + (b_2)(G) + (b_3)(B) + (b_4)(R)(G) + (b_5)(R)(B) + (b_6)(G)(B) + (b_7)(R^2) + (b_8)(G^2) + (b_9)(B^2)$$

$$b^* = (c_1)(R) + (c_2)(G) + (c_3)(B) + (c_4)(R)(G) + (c_5)(R)(B) + (c_6)(G)(B) + (c_7)(R^2) + (c_8)(G^2) + (c_9)(B^2)$$

The coefficients of the equations are obtained from tables stored in the memory of the input block. In lieu of obtaining these values form tables stored in the memory of the input block, multiplication circuitry in the input block can perform the foregoing calculation. Thus, either a table or a set of circuitry can be used to transform the RGB densities to the L*a*b* colorimetric coordinates. The signals corresponding to the L*a*b* colorimetric coordinates are transmitted to processing block 86. Processing block 86 also receives the signals from UI 14. The signals from UI 14 determine the operator adjustments to hue, saturation and darkness. If the darkness of the image is to be adjusted, L* is scaled. The scaling of L* is performed by the processing block multiplying the signal received from the input block corresponding to L* by a constant value either greater than or less than 1 depending upon whether a darker or lighter image is desired. This transformation has the effect of making the overall lightness of the images greater or less, but leaves the color unchanged. Saturation is adjusted by scaling the combination $(a^{*2}+b^{*2})$. This adjusts the saturation of the output color without changing the darkness or hue. Scaling can be achieved by a standard amplifier circuit. Rotation of a* and b* abjusts the hue of the output color without changing the darkness of saturation. The rotation operation is also performed by a circuit which receives as an input the a* and b* values and the the desired rotation, i.e. change in hue from UI 14, and computes the new a* and b* values. After the operator adjusted values of L*, a* and b* are computed by the processing block 86, signals corresponding thereto are transmitted to the output block 88. Output block 88 converts the set of colorimetric coordinates, L*, a*, and b*, to a set of subtractive primary color densities, cyan (C), magenta (M), and yellow (Y). The technique to transform the L*a*b* coordinates to CYM densities is based upon the empirical observation that a transformation exists between a set of CYM densities and L*a*b*. This relationship depends upon the characteristics of the output set of colorants and the particular sensor being used to expose the charged photoconductive belt. For a specific sensor and set of output colorants, the CYM densities and L*a*b* coordinates can be measured separately. Standard regression techniques can then be used to develop a set parameters defining the relationship between CYM and L*a*b*. The following quadratic equation provides a moderately good estimate of the relationship:

$$C=(d_1)(L^*)+(d_2)(a^*)+(d_3)(b^*)+(d_4)(L^*)(a^*)+(d_5)(L^*)(b^*)$$
$$+(d_6)(a^*)(b^*)+(d_7)(L^{*2})+(d_8)(Ga^{*2})+(d_9)(b^{*2})$$

$$M=(e_1)(L^*)+(e_2)(a^*)+(e_3)(b^*)+(e_4)(L^*)(a^*)+(e_5)(L^*)(b^*)$$
$$+(e_6)(a^*)(b^*)+(e_7)(L^{*2})+(e_8)(Ga^{*2})+(e_9)(b^{*2})$$

$$Y=(f_1)(L^*)+(f_2)(a^*)+(f_3)(b^*)+(f_4)(L^*)(a^*)+(f_5)(L^*)(b^*)$$
$$+(f_6)(a^*)(b^*)+(f_7)(L^{*2})+(f_8)(Ga^{*2})+(f_9)(b^{*2})$$

The coefficients of the equations are obtained from tables stored in the memory of the output block. In lieu of obtaining these values form tables stored in the memory of the output block, multiplication circuitry in the output block can perform the foregoing calculation. Thus, either a table or a set of circuitry can be used to transform the L*a*b* colorimetric coordinates into CYM densities. The signals from the output block 88, corresponding to the desired cyan, yellow and magenta densities, are transmitted to ROS 16 to appropriately expose the charged photoconductive belt to record the corresponding latent images thereon. In the event the operator does not desire to change the saturation, darkness or hue of the copy, the processing block scales the L*, a* and b* colorimetric coordinates by 1. In this way, the set of colorimetric coordinates remain unchanged. One skilled in the art will appreciate that the foregoing transformations can a be implemented with electronic components and are not the only transformations possible. For example, a less complex implementation can be achieved with an additive set of corrections. Each of the coordinates L*, a*, and b* is modified by adding or subtracting a constant. It is also possible to have the intermediate coordinate set be a combination of L*, a* and b*. For example, the values for the lookup tabes at the input and output blocks can operate on the L*, C, and H parameters where L*, once again refers to lightness and C and H are the psychrometric chroma and hue, respectively.

In recapitulation, the apparatus of the present invention converts a set of red, green and blue densities measured from a multicolored original document into a set of colorimetric coordinates. An operator adjusts the set of colorimetric coordinates to vary the hue, saturation and darkness of the copy. The operator adjusted set of colorimetric coordinates is converted to a set of cyan, magenta, and yellow densities used to form latent images. The latent images are developed with cyan, magenta, and yellow developer material, respectively. These developed images are than transferred, in superimposed registration with one another, to a sheet and are fused thereto forming an operator adjusted multicolor copy of the original document.

It is, therefore, evident that there has been provided in accordance with the present invention, an apparatus for adjusting the color of a copy being reproduced from a multi-colored original document that fully satisfies the aims and advantages hereinbefore set forth. While this invention has been described in conjunction with a specific embodiment and method of use thereof, it is evident that many alternatives, modifications and variations will be apparent to those skilled in the art. Accordingly, it is intended to embrace all such alternatives, modifications and variations as fall within the spirit and broad scope of the appended claims.

We claim:

1. A printing system in which the color of a copy being formed from an original document is adjustable, including:

means for scanning the original document and measuring a set of primary color densities therein;

operator controllable means, in communication with said scanning means, for converting the measured set of primary color densities to signals corresponding to a set of operator selected subtractive primary color densities, said converting means comprising first means for changing the measured set of primary color densities to a set of colorimetric coordinates, operator abjustable means, in communication with said changing means, for varying the set of colorimetric coordinates, said varying means varying the set of colorimetric coordinates to adjust independently or in combination with one another darkness, hue or saturation of the set of subtractive primary color densities and second means, in communication with said varying means, for changing the operator abjusted set of colorimetric coordinates to signals corresponding to the set of operator selected subtractive primary color densities; and a marking engine which receives the signals from said converting means and forms a copy of the original document in response thereto.

2. A printing system according to claim 1, wherein said marking engine includes:

a member adapted to have a latent image recorded thereon;

means, responsive to signals received from said converting means, for recording at least one latent image on said member; and means for developing the latent image recorded on said member with developer material corresponding to one of the set of operator selected subtractive primary color densities.

3. A printing system according to claim 2, wherein said marking engine includes:

means for transferring the developer material from said member to a copy sheet; and means for fusing the developer material to the copy sheet.

4. A printing system according to claim 1, wherein said second changing means changes the operator adjusted set of colorimetric coordinates by selected scale factors to generate the signals corresponding to the set of subtractive primary color densities.

5. A printing system according to claim 1, wherein said varying means rotates the set of colorimetric coordinates to adjust the hue of the set of subtractive primary color densities without changing the darkness or saturation of the set of subtractive primary color densities.

6. A printing system according to claim 1, wherein said varying means multiplies the set of colorimetric coordinates by a first set of scale factors to adjust the darkness of the set of subtractive primary color densities without changing the hue or saturation of the set of subtractive primary densities.

7. A printing system according to claim 1, wherein said controlling means multiplies the set of colorimetric coordinates by a second set of scale factors to adjust the saturation of the set of subtractive primary color densities without changing the hue or darkness of the set of subtractive primary color densities.

8. A printing system according to claim 1, wherein said varying means controls the set of colorimetric coordinates to adjust the set of subtractive primary color densities of the copy to correspond to the set of subtractive primary color densities of the original document.

* * * * *